United States Patent [19]

Oda

[11] Patent Number: 4,853,716

[45] Date of Patent: Aug. 1, 1989

[54] PRINTER HAVING SPECIALLY ARRAYED INK HOLES

[75] Inventor: Goro Oda, Sagamihara, Japan

[73] Assignee: Kabushiki Kaisha Toshiba, Kawasaki, Japan

[21] Appl. No.: 262,091

[22] Filed: Oct. 19, 1988

Related U.S. Application Data

[63] Continuation of Ser. No. 868,031, May 29, 1986, abandoned.

[30] Foreign Application Priority Data

May 29, 1985 [JP] Japan ................................ 60-115921

[51] Int. Cl.[4] ............................................ G01D 15/18

[52] U.S. Cl. ................................................ 346/140 R

[58] Field of Search ................ 346/76 PH, 75, 140 R, 346/153.1; 400/196, 202.2

[56] References Cited

U.S. PATENT DOCUMENTS 3,834,301 9/1974 Croguelas et al. ........... 346/153.1 X
4,608,577 8/1986 Hori ............................ 346/140 PD
4,630,075 12/1986 Hori ............................ 346/140 PD
4,679,058 7/1987 Hori .............................. 346/76 PH

FOREIGN PATENT DOCUMENTS 2257150 11/1972 Fed. Rep. of Germany .
58-178201 4/1985 Japan .
59-107544 12/1985 Japan .

*Primary Examiner*—Clifford C. Shaw
*Attorney, Agent, or Firm*—Foley & Lardner, Schwartz, Jeffery, Schwaab, Mack, Blumenthal & Evans

[57] ABSTRACT

In a printer in which a plurality of holes to be filled with ink is formed in an ink film, selectively heating ink generates bubbles from the holes and ejects ink due to the pressure of bubbles, thus printing an image on a sheet. The ink film having the holes satisfies relations $H \geqq 2P$ and $V \geqq 2P + D$ when the diameter of the holes is given as D, the pitch between two adjacent holes is given as P, the width of a heating element in a direction perpendicular to the moving direction of the sheet is given as H, and the width of the heating element in the moving direction of the sheet is given as V.

17 Claims, 10 Drawing Sheets

PRINTER HAVING SPECIALLY ARRAYED INK HOLES

This application is a continuation of application Ser. No. 868,031, filed May 29, 1986, now abandoned.

BACKGROUND OF THE INVENTION

The present invention relates to an ink-jet printer and, more particularly, to a printer which selectively heats heating elements to eject ink, thus forming an image on a sheet.

Various non-impact recording methods (e.g., electrostatic, heat-sensitive sheet heating, thermal transfer, electrophotography, and ink-jet methods) have been conventionally proposed.

Among these various methods, the ink-jet type can easily realize a low-noise, low-power consumption, compact, multi-color printer, and its constituents are inexpensive. Therefore, it has seen increasing popularity.

As is known, ink-jet printers include printers using pressure elements, static pressure acceleration, bubble-jets, and the like. In all conventional ink-jet printers, however, since a nozzle is used to eject ink from its distal end, it often clogs. In addition, since an ink-jet printer using a nozzle requires a space for moving the nozzle, a large number of nozzles cannot be concentrated within a small area, so a printing operation using many dots cannot easily be performed. Therefore, conventional ink-jet printers use a single nozzle, resulting in low printing speed.

SUMMARY OF THE INVENTION

It is an object of the present invention to provide an ink-jet printer which is free from clogging and capable of high-speed printing.

According to an aspect of the present invention, there is provided a printer, which forms an image on a sheet by ejecting ink onto the sheet in accordance with an image signal, comprising a thermal head having heating elements heated in accordance with the image signal, a recording medium in which a plurality of holes to be filled with ink are formed, and which generates bubbles from the holes when ink is heated and ejects the ink due to pressure from the bubbles, wherein when a diameter of the hole formed in said recording medium is given as D, a pitch between two adjacent holes is given as P, a width of said heating element in a direction perpendicular to a moving direction of said recording medium is given as H, and a width of said heating element in the moving direction of said recording medium is given as V, relations $H \geqq 2P$ and $V \geqq 2P+D$ are satisfied, holding means for holding said recording medium to feed it toward said heating elements of said thermal head, and ink supply means for supplying the ink to said recording medium.

DETAILED DESCRIPTION OF THE PREFERRED EMBODIMENTS

An embodiment of the present invention will now be described in detail with reference to FIGS. 1 to 17.

Figure 1:
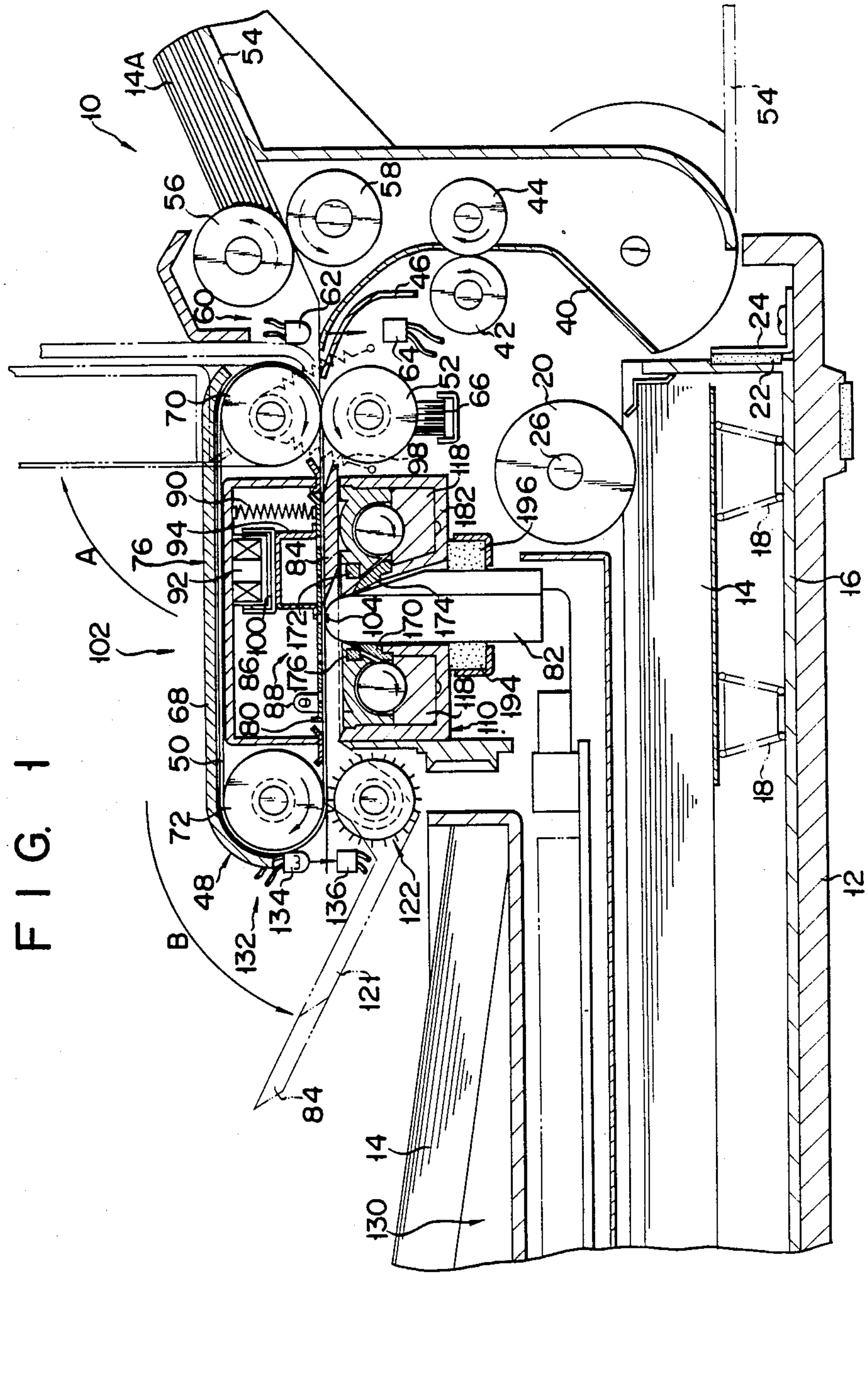
FIG. 1 is a schematic longitudinal sectional view of a printer according to an embodiment of the present invention.
Figure 2:
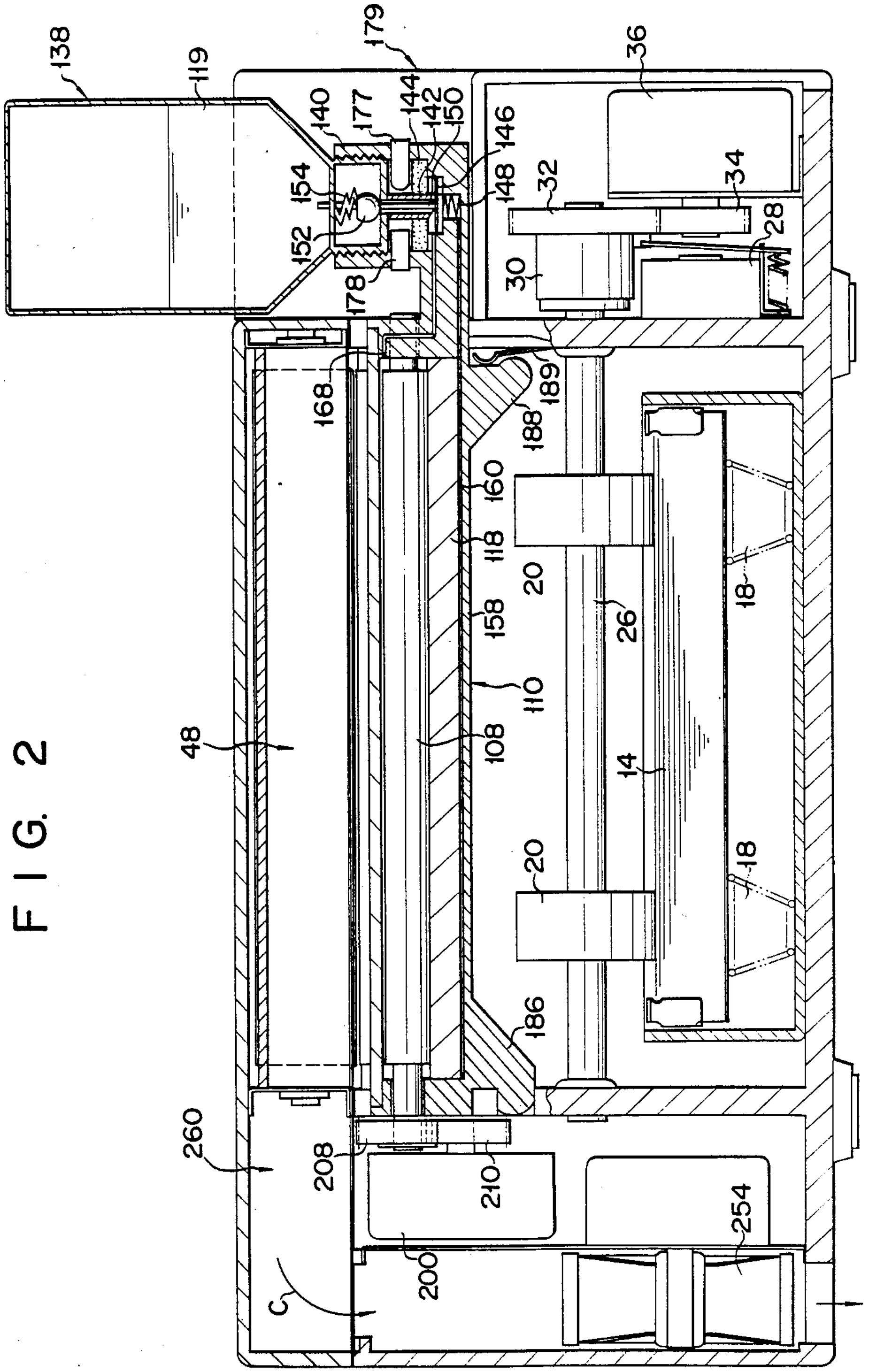
FIG. 2 is a schematic cross-sectional view of the printer shown in FIG. 1.

As shown in FIGS. 1 and 2, in printer 10 of this embodiment, paper feed cassette 16 for storing recording sheets 14 to be printed is loaded in the lower portion of housing 12. A lower plate of cassette 16 at the paper pick-up side is pushed upward by the biasing force of push-up springs 18, and uppermost recording sheet 14 is always in contact with first feed rollers 20. When cassette 16 is loaded in housing 12, rubber magnet 22 mounted on cassette 16 magnetically attracts metal plate 24 mounted on housing 12 to be fixed to housing 12.

Shaft 26 axially supports first feed rollers 20 and is coupled to paper feed motor 36 through spring clutch 30 and gears 32 and 34, as shown in FIG. 2. Spring clutch 30 which is engaged/disengaged by solenoid 28. When solenoid 28 is energized in response to a recording signal from image or data processing apparatus 38 (shown in FIG. 17) connected to printer 10, clutch 30 engages shaft 26 with gear 32. Therefore, rotating power from motor 36 is transmitted to shaft 26 through gears 32 and 34 and clutch 30, and uppermost recording sheet 14 contacting rollers 20 is conveyed.

Recording sheet 14 picked up from cassette 16 through rollers 20 is guided upward along first paper feed guide 40, and is then clamped and conveyed by a pair of feed rollers 42 and 44. Rollers 42 and 44 are arranged in a paper feed direction and in rolling contact with each other. Thus, sheet 14 is fed between first and second paper feed guides 40 and 46. Sheet 14 is fed until its front edge abuts against attraction conveyor belt 50 of paper convey unit 48 (to be described later) and register roller 52, which is in rolling contact therewith and is stopped, thus standing by at this position.

That printer 10 is provided with manual paper feed table 54 for manually feeding sheets in addition to cassette 16. When manual recording sheets 14A (e.g., thick sheets) are fed manually on table 54, they are picked up one by one from the lowermost sheet by means of second feed roller 56 and separation roller 58, and are fed until the front edge thereof abuts against belt 50 and roller 52 in the same manner as in the paper feed operation from cassette 16. In this state, sheet 14A stands by.

Roller 52 is coupled to motor 36 (FIG. 2) through clutch (not shown), and is rotated upon engagement of the clutch. Paper detector 60 for detecting the presence/absence of paper is provided between register roller 52 and second feed roller 56. Detector 60 comprises first light-emitting diode (LED) 62 and first photosensor 64 for receiving light emitted from LED 62. When the front edge of sheet 14 shuts off light from LED 62, it abuts against the rolling contact portion of roller 52 and felt 50 a given time (e.g., 2 to 3 sec) after photosensor 64 is turned off. Thus, sheet 14 is appropriately bent.

In this bending of the sheet, the inclination of the front edge of sheet 14 (skew) can be corrected, and the front edge is reliably fed into the rolling contact portion of roller 52. Therefore, sheet 14 can be satisfactorily clamped between roller 52 and belt 50.

Note that dust removing brush 66 for removing paper dust attached to the circumferential surface of roller 52 is in sliding contact with the lower surface of roller 52, thus preventing the recording surface of sheet 14 from being contaminated.

Paper convey unit 48 comprises first and second floating sections 76 and 78. First floating section 76 incorporates first and second rollers 70 and 72, belt 50 looped between rollers 70 and 72, and air suction duct 74 in cover 68. Second floating section 78 comprises belt guide plate 80 and belt urging/separating mechanism 86 for urging belt 50 against or separating it from guide 84 for guiding sheet 14 to thermal head 106 (to be described later).

In mechanism 86, belt guide plate 80 is pivotally supported at its one end by hinge 88 in duct 74, and the other end thereof is biased downward by spring 90, thus urging belt 50 against guide 84. Attraction member 94 is mounted on the back surface of guide plate 80 to face electromagnetic coil 92. When coil 92 is energized, guide plate 80 is shifted against the biasing force of spring 90.

First floating section 76 is biased against roller 52 by spring 98 looped around roller 70 and having two ends fixed to housing 12, and guide plate 80 of second floating section 78 is elastically suspended by spring 90. Therefore, even if supplied sheet 14A is thick, sections 76 and 78 can be shifted accordingly.

High-viscosity fluid shock-absorber 100 is mounted on belt 80 of second floating section 78 to absorb shocks applied to belt 80.

Paper convey unit 48 is pivotally supported coaxially with the shaft of first roller 70, and can pivot in the direction indicated by arrow A to open a paper convey path. Therefore, if paper jam occurs midway along the convey path, the jammed paper or the cause of the jam can be removed at ease.

When roller 52 begins to rotate, the front edge of sheet 14 is clamped between roller 52 and belt 50 of first floating section 76 at an appropriate pressure by the biasing force of spring 98. Then, sheet 14 is conveyed by the clamping and conveying force of rollers 52 and 70 and the attraction and conveying force of belt 50.

In this case, sheet 14 is urged against guide 84 by mechanism 86, and is guided to print unit 102 to be slid along guide 84.

Figure 7:
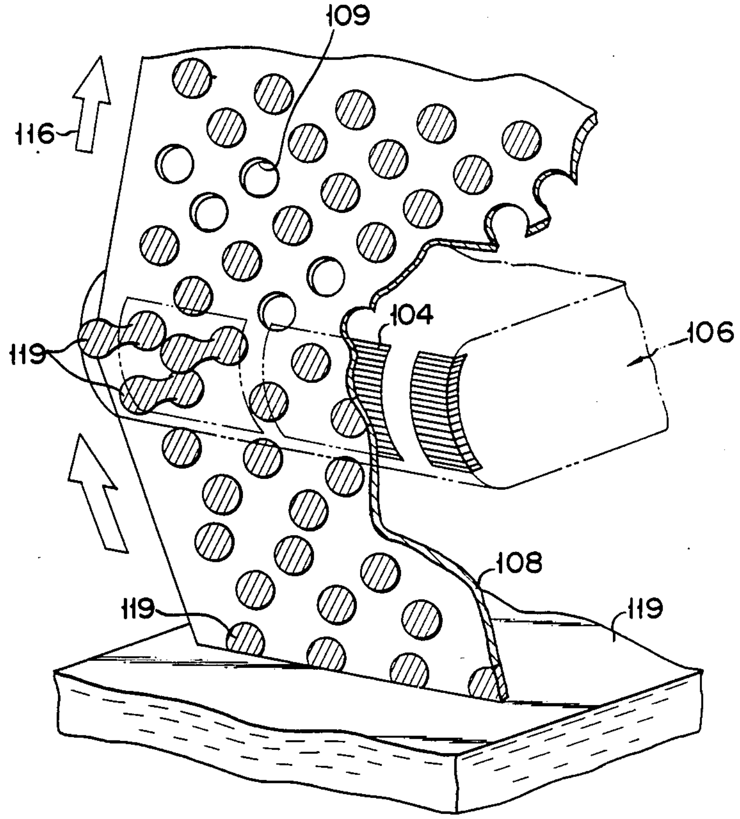
FIG. 7 is a perspective view for explaining an ink coating state in the print unit shown in FIG. 6.

In print unit 102 ink is ejected onto sheet 14 conveyed to print unit 102, thus printing an image thereon. Print unit 102 is provided with thermal head 106 on the top of which heating elements 104 are arranged. Elements 104 are heated in accordance with an image forming signal from data processing apparatus 38. As shown in FIG. 7, thermal head 106 is covered with ink film 108 as a printing medium in the printing state. Ink film 108 is formed of a metal, organic material, or the like (e.g., a nickel sheet as a hydrophilic material), and a large number of holes 109 having a diameter of about 10 to 200 /μm are formed therein. The surface of ink film 108 facing sheet 14 is coated with polyethylene as hydrophobic material. Ink film 108 is held in ink film cartridge 110 filled with ink and wound around a pair of rolls 112 and 114.

As shown in FIG. 7, when print unit 102 conveys ink film 108 in the direction indicated by arrow 116, small holes 109 pass through ink reservoir 118 containing ink 119 and are filled with ink 119. When small holes 119 filled with ink 119 have reached thermal head 106 having heating elements 104, heating elements 104 are selectively supplied with a voltage to be heated quickly. Then, ink droplets are ejected due to pressure from bubbles upon heating of heating elements 104, thus printing an image on sheet 14.

Guide 84 described previously is fixed with reference to thermal head 106, so that the surface of guide 84 is separated from heating elements 104 of head 106. In this case, the recording surface (lower surface) of sheet 14 separates by a small gap (e.g., 0.2 mm) from the surface of film 108, which moves to contact heating elements 104 of thermal head 106. In this embodiment, the gap between the surfaces of film 108 and sheet 14 is kept within the range of about 0.1 to 0.3 mm when a resolution of 8 lines/mm is to be maintained.

If the gap is set to be 0.1 mm or less, when ink 119 soaks into sheet 14, the corresponding sheet portion expands, and is brought into contact with the surface of film 108, thus contaminating the recording surface with ink. Therefore, in this embodiment, reference projection 120 of thermal head 106 (FIG. 6) is urged against arm portion 121 of guide 84 to strictly keep the gap within the range of 0.2±0.05 mm.

Figure 8:
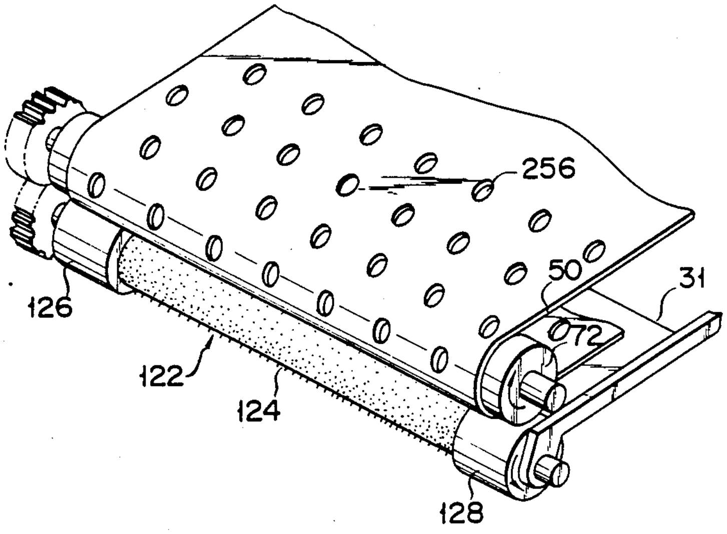
FIG. 8 is a partial perspective view of a paper discharging unit.

After printing, when the front edge of sheet 14 further moves forward, it is clamped between second roller 72 of first floating section 76 and paper discharge roller 122. In this case, as shown in FIG. 8, the recording surface of sheet 14 is supported by needle-shaped portion 124 having needles projecting from the circumferential surface of roller 122. Reference roller portions 126 and 128 are provided at two end portions of roller 122 and are in rolling contact with belt 50. Therefore, sheet 14 can be conveyed without receiving an excessive pressure, thus protecting an undried image from being deteriorated. More specifically, since the ink ejected on sheet 14 is not rubbed by roller's surface, a clear image can be obtained.

Sheet 14 further moves forward and the rear edge thereof passes through the rolling contact portion between register roller 52 and first roller 70.

In this case, a force for urging sheet 14 against guide 84 is transmitted through mechanism 86, and belt guide plate 80 of second floating section 78 is pushed upward relative to the housing of first floating section 76 by a reaction force to plate 80 from guide 84 against the biasing force of spring 90 through shock-absorber 100.

After the rear edge of sheet 14 has passed between rollers 52 and 70, roller 52 and belt 50, which are temporarily separated, are again brought in rolling contact with each other by their weights. Therefore, the pressure applied on sheet 14 is reduced to the total weight of plate 80 and the biasing force of spring 90, and sheet 14 can be smoothly conveyed.

If the rear edge of sheet 14 receives the total weight of paper convey unit 48, sheet 14 must be conveyed while receiving a large frictional force, resulting in unstable conveyance.

When sheet 14 moves further forward and the rear edge thereof has passed by the edge portion of guide 84 at the side of thermal head 106, guide plate 80 has already been pushed upward through shock-absorber 100, and can be moved downward slowly by the shock-absorbing effect of shock-absorber 100. Therefore, the rear edge of sheet 14 can pass by heating elements 104 of thermal head 106 while the sheet 14 is approaching the surface of film 108.

If belt guide plate 80 does not receive any reaction force and is moved downward by its total weight and the biasing force of spring 90, immediately after the rear edge of sheet 14 passes through the edge portion of guide 84, the surface of film 108 is brought into contact with the recording surface of sheet 14, thus contaminating the rear edge of sheet 14 with ink.

In this embodiment, when the front or rear edge of sheet 14 falls within the range of about 6 mm from heating elements 104 forward and backward along the paper convey direction, electromagnetic coil 92 is energized to attract guide plate 80 upward. Then, sheet 14 separates from the surface of film 108, thus preventing the front or rear edge of sheet 14 from contacting the surface of film 108 when the front or rear edge of sheet 14 is folded or bent.

In this way, film 108 will not contact and contaminate sheet 14. In addition, sheet 14 passes by roller 122 while maintaining a small gap between belt 50 and film 108, and is discharged onto paper discharge tray 130 without being contaminated.

Detector 132 for detecting if sheet 14 has been discharged is provided between rollers 122 and 72 at the side of tray 130. Detector 132 comprises second LED 134 and second photosensor 136 facing the paper convey path. When sheet 14 is discharged to tray 130 and the rear edge thereof passes by LED 134, a rising signal of photosensor 136 is detected to detect that sheet 14 is discharged.

Ink supply from ink tank 138 to film cartridge 110 and from ink reservoir 118 of cartridge 110 to ink film 108 will be described with reference to FIGS. 1 and 2.

As shown in FIG. 2, film cartridge 110 and ink tank 138 are detachably mounted. Ink 119 is stored in tank 138, which is screwed in and fixed to ink-tank mounting portion 140 of cartridge 110. Transparent ink supply tube 142 of tank 138 pushes valve 146 of cartridge 110 in tight contact with seal 144 for mounting portion 140 against the biasing force of spring 148.

Figure 6:
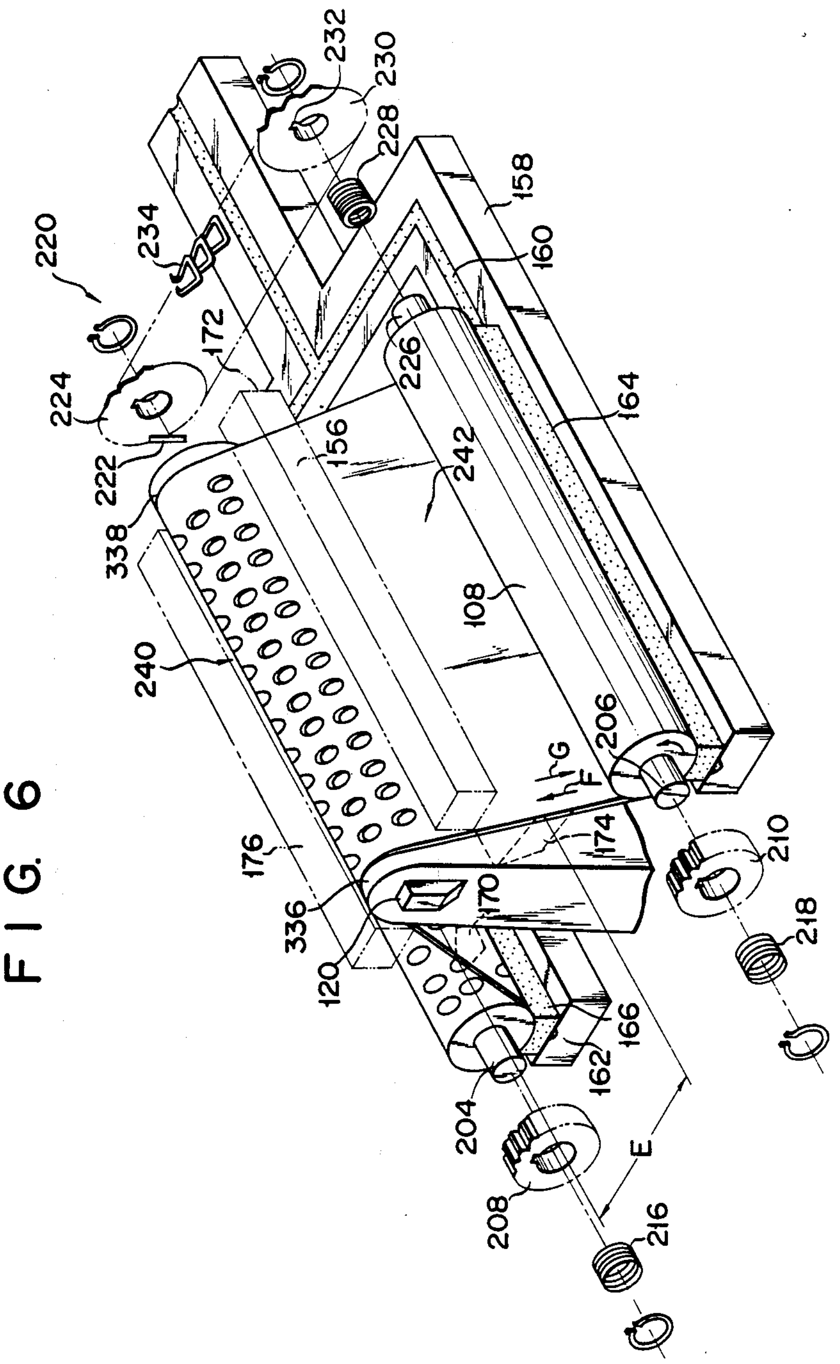
FIG. 6 is a perspective view of a print unit.

Valve 146 of cartridge 110 pushes ink-tank open/-close rod 150 upward and, therefore, pushes valve 152 of tank 138 against the biasing force of valve spring 154, thus supplying ink 119 in tank 138. Ink 119 is supplied from tank 138 until the obliquely cut distal end portion of tube 142 is filled with ink. Ink 119 is caused to flow into narrow ink supply paths 160 and 162 formed in container portion 158 of cartridge 110 through small holes formed in the surrounding portion of valve 146 of cartridge 110 and guide path 156, as shown in FIG. 6.

Ink 119 soaks into felt ink supply members 164 and 166, and is coated on film 108 therethrough. Therefore, as shown in FIG. 7, small holes 109 of film 108 are filled with ink 119, and ink droplets are formed by bubbles upon quick heating of heating elements 104.

In mounting portion 140, when ink 119 is consumed and the level of ink 119 drops below the obliquely cut distal end of tube 142, air is taken from air suction path 168 formed in ink reservoir 118 of cartridge 110 into ink tank 138, thus supplying new ink 119.

Air suction path 168 is formed in the upper portion of mounting portion 140, so that its volume is set as small as possible, as can be seen from FIGS. 1 and 2. As will be described later, air communication with respect to ink reservoir 118 is allowed only when small holes 109 of film 108 pass by first and second excessive ink removing members 170, 172, 174, and 176 of elastic rubber, which also act as seal members. Thus, ink 119 can be refilled from tank 138 to ink reservoir 118 when film 108 is moved, but this operation is not allowed when cartridge 110 is exchanged or moved.

Thus, ink 119 will not be excessively supplied to cartridge 110 and leaks prevented.

As shown in FIGS. 1 and 2, since ink 119 is supplied to film 108 through felt ink supply members 164 and 166, it will not form a free surface as liquid in ink reservoir 118. Therefore, since ink 119 is trapped in felt fibers by its surfaces tension, it cannot leak outside cartridge 110.

The operation when tank 138 is demounted from mounting portion 140 of cartridge 110 will be described below.

When ink 119 in tank 138 is used up upon refilling thereof, the level of ink 119 drops further and reaches tube 142. In this case, light emitted from ink detection LED 177 is transmitted through tube 142 to turn on opposing ink detection photosensor 178, thus producing a detection signal. Thereby, a no-ink state of ink tank 138 can be detected.

Then, printer 10 displays the no-ink state on a display portion thereof or on a display portion of data processing apparatus 38 connected thereto. When ink 119 is not supplied to head 106, the no-ink state of tank 138, i.e., a need for replacement of it, is signaled.

Ink tank 138 is thus replaced. In this embodiment, a demounting procedure and the operation of valve 152 of tank 138 and valve 146 of cartridge 110 are performed in a manner opposite that described previously.

More specifically, valve 146 of cartridge 110 moves upward and is brought in tight contact with the lower surface of seal 144 by the biasing force of spring 148, thereby preventing ink 119 in cartridge 110 from being leaked therefrom.

Note that in this embodiment, tank 138 has a volume of about 100 cc, and except for tube 142 is formed of a non-transparent material in consideration of weather resistance. About 2,000 to 5,000 A4-size sheets can be printed at a normal recording density using about 100 cc of ink. Film cartridge 110 is preferably replaced after 100,000 A4-size sheets are printed or after 3 years have passed because of clogging of small holes 109 of film 108 due to paper dust, mold, dried ink, and the like. For this purpose, cartridge 110 and tank 138 are separately arranged. In addition, with the above structure, leakage or evaporation of ink 119 from tank 138 can be prevented.

Mounting of film cartridge 110 on printer 10 will be described.

Figure 4:
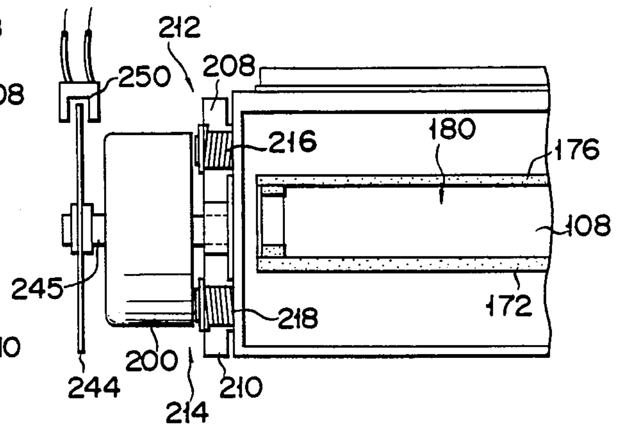
FIG. 4 is a plan view of the film convey unit shown in FIG. 3.
Figure 5:
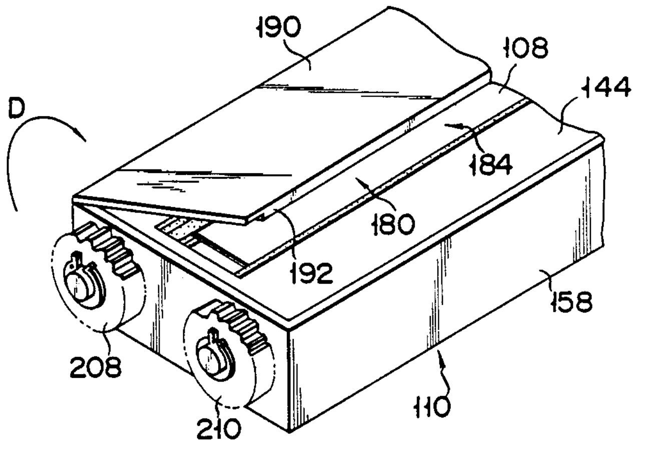
FIG. 5 is a partial perspective view of a film cartridge.

In printer 10, thermal head 106 is fixed to housing 12, and window 184 is formed in container 158 positioned at film exposing portion 180 of cartridge 110. Therefore, thermal head 106 can be inserted therethrough to be set on housing 12, as shown in FIGS. 4 and 5.

As shown in FIG. 2, first supporting portion 186 of cartridge 110 is inserted in housing 12, and second supporting portion 188 thereof provided at its other end is pushed downward. In this case, cartridge fixing spring 189 is moved to the right in FIG. 2, and the recess portion of second supporting portion 188 is engaged with the head portion of spring 189, thereby fixing cartridge 110.

With the above arrangement of this embodiment, container 158 of cartridge 110 has a window, thus providing sufficient mechanical strength to cartridge 110.

As described above, cartridge 110 can be easily mounted or demounted, even if ink tank 138 is mounted thereon. The color of ink 119 can be changed simply by replacing cartridge 110. When cartridge 110 is mounted or demounted, guide plate 80 pivots upward as indicated by arrow A in FIG. 1, and guide 84 pivots as indicated by arrow B, to widely open the upper portion of cartridge 110, thus allowing easy removal of jammed paper in paper convey unit 48 and paper dust attached to film 108, and facilitating replacement of cartridge 110.

When cartridge 110 is demounted, in order to prevent leakage or evaporation of remaining ink 119 in cartridge 110, cartridge cover 190 is pivotally hinged on film exposing portion 180 of cartridge 110, as shown in FIG. 5, and pivots to cover film exposing portion 180, as indicated by arrow D. Projection 192 of cover 190 is in tight contact with first and second excessive ink removing members 170, 172, 174, and 176, thus providing a seal to cartridge 110.

As shown in FIG. 1, in this embodiment, a pair of ink absorbing members 194 and 196 are arranged to be in contact with the lower portion of thermal head 106, thereby absorbing ink 119 flowing along the wall of thermal head 106. Therefore, ink leakage from head 106 can also be prevented.

The drive operation of ink film 108 will now be described.

Figure 3:
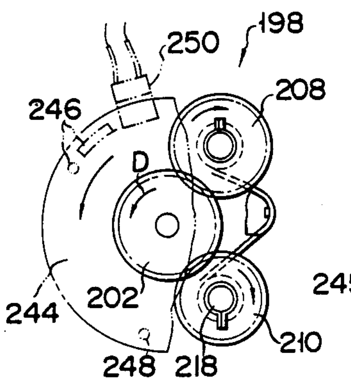
FIG. 3 is a side view showing a main portion of a film convey unit of the printer shown in FIG. 1.

FIG. 3 is a side view of film drive mechanism 198 as a printing medium drive mechanism, and FIG. 4 is a plan view thereof. Film drive mechanism 198 comprises film drive motor 200 and gear 202 mounted on the shaft of motor 200. Gear 202 is meshed with gears 208 and 210 of a pair of rolls 204 and 206 around which film 108 is wound. One-way clutch 212 is interposed between roll 204 and gear 208, and one-way clutch 214 is similarly interposed between roll 206 and gear 210. Note that motor 200 can be rotated in the reverse direction, and ink film 108 can be moved upward or downward in FIG. 3.

As shown in FIG. 6, since one end of left-hand wind spring 216 fitted in film roll 204 is engaged with the recess portion of gear 208, when gear 208 is rotated clockwise, spring 216 is more tightly wound around roll 204, thus transmitting power from gear 208 to roll 204.

In this case, gear 210 causes right-hand wind spring 218 fitted in roll 206 to be loosened from roll 206. In this embodiment, however, since roll 206 and spring 218 are rotated in the same direction, they slip.

When film cartridge 110 is mounted or demounted, since gears 208 and 210 are separately meshed with motor gear 202, film 108 may be kept slack or an excessive tension may be continuously applied thereto. In the latter case, film roll 206 and spring 218 can slip to alleviate excessive tension.

As shown in FIG. 6, cartridge 110 is provided with film tension mechanism 220 for applying a given tension to film 108 at the side opposite rolls 204 and 206. Film tension mechanism 220 removes slack in film 108, and causes film 108 to be pressed against heating elements 104 of thermal head 106 at an appropriate pressure. Ladder wheel 224 is fixed to one end of roll 204 by pin 222, and left-hand wind torsion spring 228 is fitted in one end portion 226 of roll 206. The other end of torsion spring 228 is engaged with notch portion 232 of ladder wheel 230, which is coupled to wheel 224 through ladder chain 234.

Referring to FIG. 6, torsion spring 228 is twisted so that roll 206 is biased thereby counterclockwise and roll 204 is biased thereby clockwise when ladder chain 234 is looped between ladder wheels 224 and 230. Therefore, an appropriate tension can be applied to film 108 in accordance with a torsion force (i.e., torque) from torsion spring 228. As a result, when film 108 is mounted on printer 10, it can be slidably moved to be in tight contact with the distal end portion of head 106 at an appropriate pressure without being slackened.

A case will be described wherein gear 202 is rotated counterclockwise in FIG. 3.

In this case, gear 210 is rotated counterclockwise, and spring 218 is operated to be tightly wound around roll 206. Then, film 108 is moved in a direction to be taken up by roll 206. In this way, upon clockwise or counterclockwise rotation of motor 200, film 108 is reciprocated. In this embodiment, slackening of film 108 can be prevented upon operation of springs 218 and 216 and mechanism 220 when cartridge 110 is mounted or demounted, and film 108 or thermal head 106 will not be damaged due to excessive tension.

Figure 14:
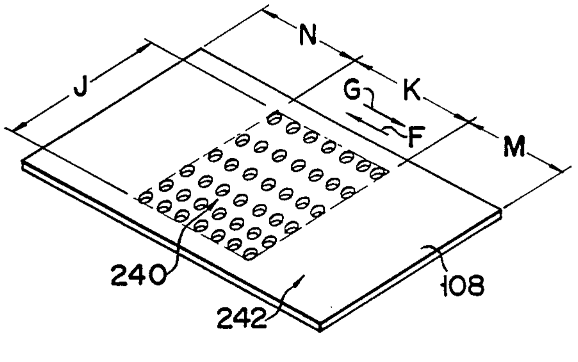
FIG. 14 is a partial perspective view of the ink

As shown in FIG. 14, region 240 having a large number of holes 109 and regions 242, which have no holes and are formed at two sides thereof, are formed on film 108. When the printing operation is performed, region 240 must face heating elements 104. When the printing operation begins, the front end portion of region 240 in the film moving direction reaches heating elements 104. Therefore, film position detection mechanism 250 for detecting the front and rear end portions of region 240 of film 108 is provided in film drive mechanism 198.

As shown in FIGS. 3 and 4, in detection mechanism 250, detection wheel 244 for detecting a film position is mounted on drive shaft 245 of motor 200. In wheel 244, first and second slits 246 and 248 are formed at positions corresponding to two boundary portions of region 240 of film 108, i.e., the front and rear end portions in the film moving direction. First slit 246 consists of an elongated hole and a round hole, and second slit 248 consists only of a round hole. Position detector 250 for detecting the positions of slits 246 and 248 with light is arranged to sandwich the edge portion of wheel 244.

Figure 17:
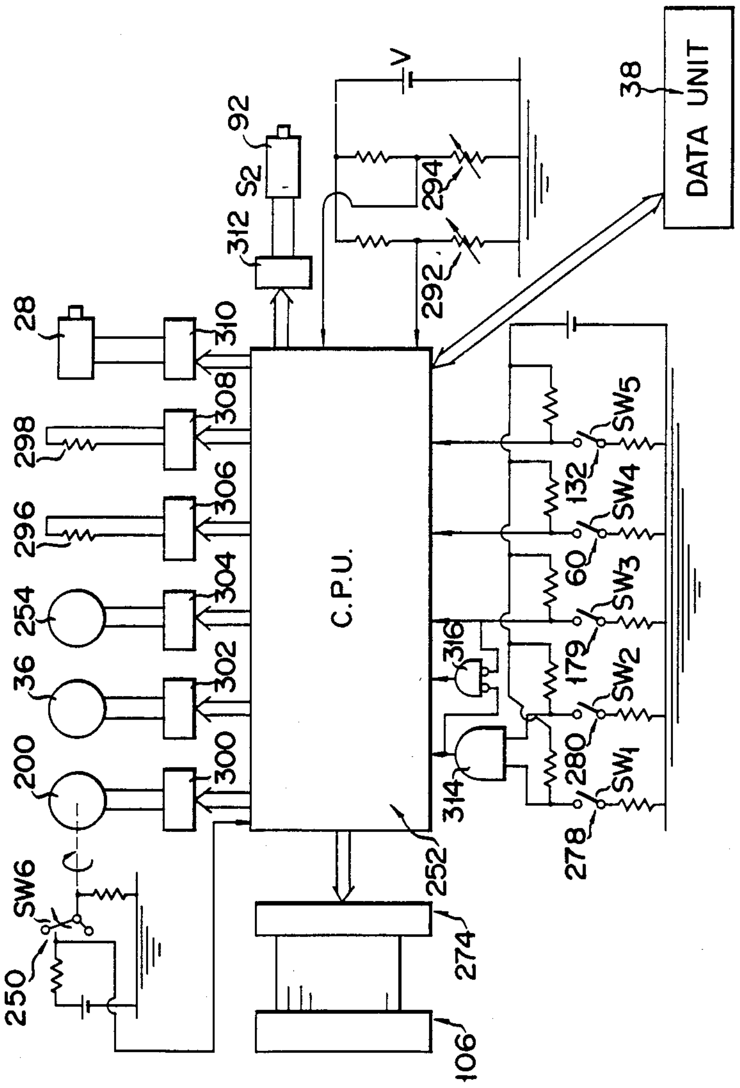
FIG. 17 is a schematic block diagram of a control circuit of the printer shown in FIG. 1.

When motor 200 is rotated, position detector 250 senses short and long light pulses formed by holes of slit 246, and compares them with a constant clock pulse incorporated in electric control circuit 252 (FIG. 17). As a result, detector 250 detects at the rear end of the elongated hole along the clockwise direction that the detected slit is first slit 246. When detector 250 senses a single light pulse transmitted through slit 248, it can detect that the detected slit is second slit 248. Motor 200 receives a stop signal from control circuit 252 when detector 250 detects first slit 246.

When motor 200 is stopped, region 242 of film 108 (FIG. 14) covers film exposing portion 180 of cartridge 110, and region 240 is stored in ink reservoir 118 below ink removing members 172 and 174 provided to cartridge 110. Since cartridge 110 is covered with region 242, it can be sealed from the outer atmosphere.

In this way, evaporation of ink 119 in cartridge 110, which causes an increase in viscosity of ink 119, can be prevented. If the viscosity of ink 119 is increased, the ejection speed of ink droplets from holes 109 is decreased or, in the worst case, prevent ejection therefrom.

Print unit 102 receives a printing command from data processing apparatus 38 (shown in FIG. 17), connected to printer 10, for processing image or character data, and drives first feed rollers 20 to supply recording sheet 14 to paper convey unit 48. When motor 200 is rotated counterclockwise in the direction indicated by arrow D in FIG. 4 by a predetermined number of pulses, film 108 is moved for a predetermined period of time. The front end portion of region 240 of film 108 in the film moving direction is thus positioned at heating elements 104, and awaits arrival of recording sheet 14 to coincide with the front edge of sheet 14. Thereafter, film 108 is moved in synchronism with movement of sheet 14. The moving speed of film 108 (20 mm/sec) is half that of sheet 14 (40 mm/sec).

Figure 15:
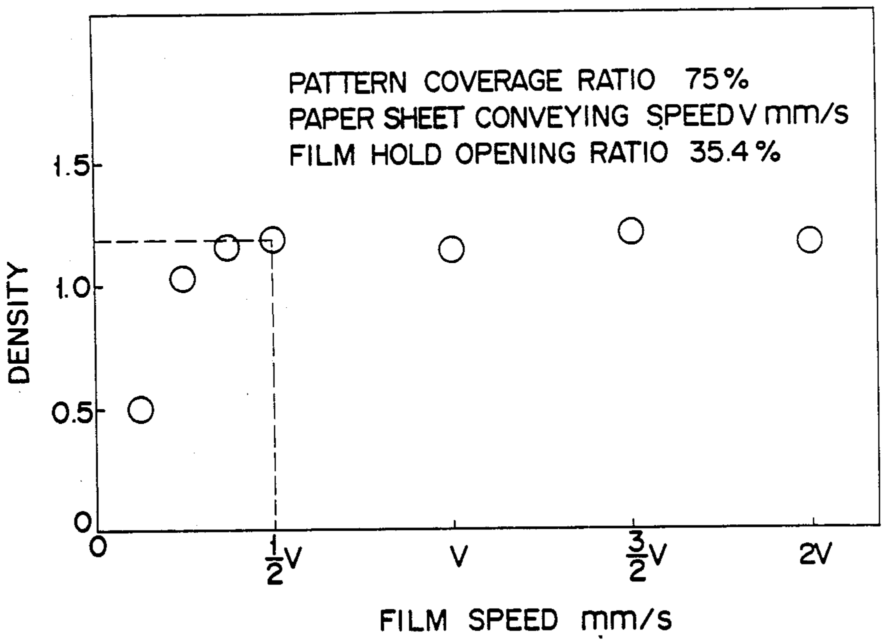
FIG. 15 is a graph showing the relationship between a film speed and a recording density according to the embodiment of the present invention.

As shown in FIG. 15, when the moving speed of sheet 14 is varied within the range of 10 to 100 mm/sec, if the moving speed of film 108 is V/4 or higher with respect to moving speed V of sheet 14, the recording density of sheet 14 can be 1.0 or more (black solid, hole opening ratio 34.5%, coverage ratio of the printing portion to the sheet 75%) regardless of a moving direction of sheet 14 relative to film 108. Note that the hole opening ratio is the ratio of hole area to film area.

Therefore, a moving distance of film 108 can be made shorter than the recording length (recording direction) of sheet 14, the area of region 240 can be reduced, and film 108 can be manufactured with ease. If region 240 has a large area, it is difficult to form uniform-diameter holes (25 to 30 μm) over the entire area of region 240. Therefore, the diameter of holes 109 is reduced at, e.g., surrounding portions, resulting in irregular recording density. However, in this embodiment, the area of region 240 can be reduced, thus obtaining a regular, uniform image.

When film 108 is subsequently moved, the rear end of region 240 reaches heating elements 104 from the side of removing members 172 and 174. Film position detector 250 then detects second slit 248. In this case, in order to satisfy the above relationship between the respective positions of film 108 and first and second slits 246 and 248 of wheel 244, film 108 must be wound at the side of members 172 and 174 upon setting of cartridge 110. In addition, motor 200 must be stopped upon detection of the round hole of first slit 246 by detector 250.

When sheets 14 are continuously supplied and nth sheet 14 (n is an even integer) is subjected to recording, film 108 is wound until the rear end of region 240 at the side of members 172 and 174 reaches roll 204, to be filled with ink 119. Thereafter, film 108 is moved in a direction opposite to the film moving direction as described above. Arrival of the rear end of region 240 is awaited for a predetermined period of time to align the front end of sheet 14 with the rear end of region 240, and film 108 and sheet 14 are then fed in synchronism with each other for recording.

When (n+1)th sheet 14 is to be recorded, the other end of region 240 at the side of members 170 and 176 is wound around roll 206 to be filled with ink 119, and is then returned to heating elements 104. After the corresponding end of region 240 is aligned with the front edge of sheet 14, film 108 is moved.

Since the recording operation is performed by the reciprocal movement of film 108, continuous recording is enabled.

First and second excessive ink removing members 170, 174, 176, and 172 are alternately arranged to be in contact with film 108, and second members 174 and 176 are arranged above first members 170 and 172.

Since film rolls 206 and 204 are arranged below the top of thermal head 106, print unit 102 can be rendered compact, and sheet 14 can be conveyed while strictly maintaining a gap between sheet 14 and heating elements 104. In addition, when rolls 204 and 206 are arranged below first members 170 and 172 arranged at the side of thermal head 106, the distance between second members 174 and 176 can be reduced, and the area of film exposing portion 180 can also be reduced. Therefore, compact film cartridge 110 can be provided.

A case will be described wherein film 108 is moved in the direction indicated by arrow G in FIG. 6. Film 108 filled with ink 119 through ink reservoir 118 is moved upward, and excessive ink is removed from film 108 by first excessive ink removing member 170. However, during the recording operation, since region 240 passes by member 170, excessive ink 119 is moved by a constant amount to the side opposite thermal head 106 through region 240.

Ink 119 moved to the opposite side is removed by second excessive ink removing member 174, and is then transferred to the side of thermal head 106. When film 108 is moved in the direction indicated by arrow G and region 240 passes by members 170 and 174, the sufficient amount of ink 119 can be coated not only on holes 109 but on the entire surface of film 108.

Therefore, this reduces film moving speed to $\frac{1}{4}$ that of sheet 14.

A case will be described when region 240 is moved downward along members 170 and 174. First, ink on the recording surface side of film 108 is removed by member 172. Therefore, dust or paper powder attached to film 108 is removed as well as excessive film 119 attached thereto. In this case, ink 119 left on the distal end portion of member 174 is moved to the side of thermal head 106 through holes 109 of region 240, and is again removed by member 170, thus being left on the distal end portion of member 170.

Ink 119 removed and left on the distal end portion of member 170 is then moved to the side opposite to thermal head 106 through holes 109 of region 240. In this way, excessive ink 119 is recovered in ink reservoir 118 of cartridge 110.

When region 242 of film 108 passes by members 170 and 174 in a direction indicated by arrow F in FIG. 6 (i.e., downward), the surface of film 108 opposite to thermal head 106 is already cleaned by member 176, and need not be cleaned by member 174. However, paper powder and rubber dust are deposited on the distal end portion of member 174.

The surface of film 108 at the side of head 106 is also cleaned by member 172, and need not be cleaned by member 170.

When region 242 of film 108 covers film exposing portion 180 of cartridge 110, the exposed portion of film 108 is cleaned, and the operator need not soil his hands with ink.

As shown in FIG. 14, since lengths M and N of regions 242 of film 108 are set to be longer than film exposing width E (FIG. 6) of cartridge 110, air communication through a gap between first and second excessive ink removing members 170, 172, 174, and 176 can be prevented. Thus, ink 119 can be protected from evaporation, and the viscosity thereof will not be changed, thus providing a clear image.

An operation for removing paper dust attached to film 108 will be described.

When film 108 is moved in the direction indicated by arrow G (FIG. 6), paper powder and dust attached to the distal end portion of member 176 are also moved together with film 108 and then reach heating elements 104 of head 106. Film 108 is clamped between heating elements 104, and is slightly reciprocated several times. At the same time, suction fan 254 (FIG. 2) is energized to attract paper particles or dust on film 108 and draws them into air-suction guide 258 through suction hole 256 (FIG. 8) of belt 50.

As a result, paper powder or dust attached to film 108 can be removed, thus preventing clogging of holes 109 of region 240 of film 108.

In this embodiment, since the paper-powder is removed when about thirty seconds of time has passed after a series of successive recording operations, the print operation will not be adversely influenced.

When region 242 of film 108 is exposed from cartridge 110, the paper-powder removing procedure is executed. Therefore, ink 119 will not be drawn into guide 258 nor become attached to belt 50.

The operation of film 108 after a series of recording operations by print unit 102 will be described.

After the series of recording operations is completed, film 108 is moved at a lower speed than in a recording mode for a predetermined period of time (several seconds). This prevents ink 119 from being dried by heat from heating elements 104 of head 106 before the recording operation is completed. Next, the paperpowder removing procedure is carried out for about 10 seconds, and film exposing portion 180 of cartridge 110 is then covered with region 242 of film 108.

First excessive ink removing members 170 and 172 are formed of an elastic member, and the edges thereof at the side of thermal head 106 are in tight contact with thermal head 106 at the lower surface of film 108. As a result, ink 119 flowing down along the wall of head 106 can be recovered in ink reservoir 118 of cartridge 110 through holes 109 of region 240 of film 108. Since members 170, 174, 176, and 172 are formed of a material that is impermeable to air, communication between ink 119 inside cartridge 110 and air outside cartridge 110 can be prevented.

The relationship between the diameter of holes 109 of film 108 and the pitch therebetween will be explained with reference to FIG. 9.

Figure 9:
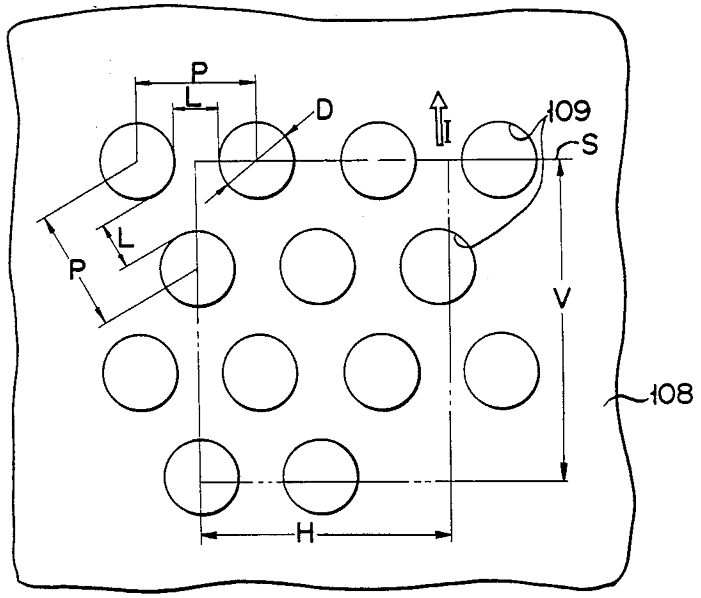
FIG. 9 is a partial plan view of an ink film.

Referring to FIG. 9, arrow I indicates the moving direction of film 108, and three adjacent holes 109 are arranged to form a regular triangle. In FIG. 9, reference symbols H and V indicate dimensions of heating elements 104, which are respectively 100 $\mu$m to 125 $\mu$m. Reference symbol D denotes a diameter of hole 109, which is 25 $\mu$m; P, a pitch between the centers of adjacent holes 109, which is 45 $\mu$m; and L, minimum distance between adjacent holes 109, which is 20 $\mu$m. From the tests, it was found that when a maximum distance between adjacent holes 109 was given by P, relations $H \geqq 2P$ and $V \geqq 2P + D$ were satisfied. In addition, in the case of a resolution of 8 lines/mm, when diameter D of hole 109 fell within the range of $D = 15$ to 35 $\mu$m and P fell within the range of $P = 40$ to 50 $\mu$m, good printing quality could be obtained.

Figure 16:
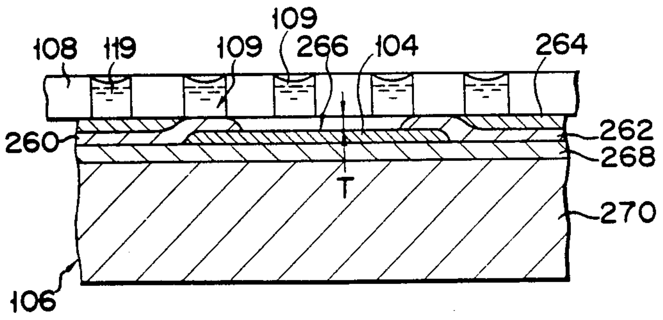
FIG. 16 is a partial sectional view for explaining an arrangement of an energizing element portion of the thermal head with regard to the ink film.

FIG. 16 shows a cross section of heating elements 104.

Heating elements 104 and electrical conductors 260 and 262 are covered with wear-resistant thin insulating film 264 of aluminum oxide ($Al_2O_3$). When a voltage is applied to heating elements 104 to quickly heat them, bubbles are formed from elements 104. Ink 119 filled in holes 109 is immediately ejected due to the pressure of the bubbles, thus achieving the printing operation. In this embodiment, resistance is set at 300Ω, and the 24-V voltage of pulse width of 10μ/sec is applied to elements 104 to eject ink. 2,100 erg per heating element is consumed.

When thickness T of gap 266 between heating elements 104 and film 108 exceeds 3 $\mu$m, ink ejection power is substantially uniform, and good printing quality can be obtained. However, if thickness T exceeds 10 $\mu$m, ejection power is reduced and printing quality is degraded. When thickness T is below 3 $\mu$m, energy consumption per heating element 104 exceeds 2,100 erg, and the smaller thickness T, the more energy is required. In this embodiment, thickness T is set to be 3 $\mu$m. Note that in FIG. 15, reference numeral 268 denotes a glazed glass layer. As a material for heating element 104, a metallic oxide thin film, which contains ruthenium oxide as a major component and 0.6 to 2.0% (atomic ratio: M/Ru [ruthenium]) of M (M is at least one element selected from the group consisting of Ca [calcium], Sr [strontium], Ba [barium], Pb [lead], Bi [bismuth], and Tl [thallium]) is used.

When the metallic oxide thin film is used, a change in resistance due to oxidation can be prevented. Therefore, high electric power can be applied to heating elements 109 to heat them to high temperatures regardless of the change in resistance, and stability over long-term use can be assured. Since the metallic oxide thin film used for heating elements 104 has a relatively high resistance, only a small current is required to obtain high heating density. For this reason, current flowing through a conductive layer connected to a heating resistor is reduced, and heat generation from this portion can be suppressed. Therefore, so-called image blurring during the printing operation can be prevented. In addition, since the thin film has a positive resistance-temperature coefficient, large current can be initially applied thereto to achieve high-speed printing.

Figure 13:
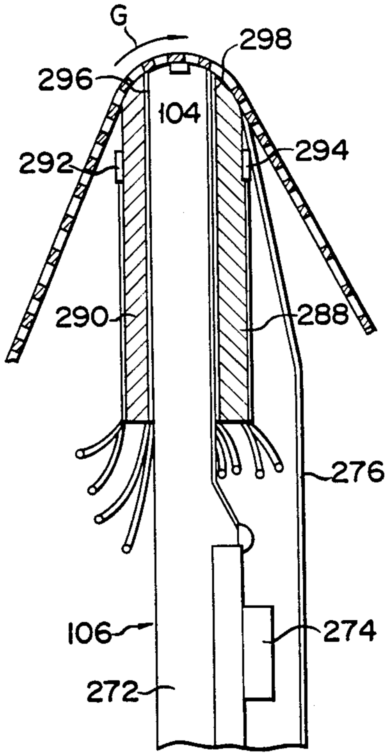
FIG. 13 is a sectional view of the thermal head.

The structure of thermal head 106 will now be described with reference to FIG. 13.

Heating elements 104 and electrical conductors 260 and 262 are formed on 15-$\mu$m thick polyimide film 270, which is fixed by adhesive to metal supporting member 272 of aluminum. It is assumed from energy consumption distribution that most of the energy consumed by pulse heating of heating elements 104 (70% or more) is not used for ejecting ink 119, but is accumulated in film 270 or 108. Reference numeral 274 denotes a driver for thermal head 106; and 276, a protective cover.

For example, in an A4-size paper longitudinal feed type line printer having a resolution of 8 lines/mm and a recording speed of 40 mm/sec, when recording of high coverage ratio (e.g., graphic recording) is to be performed, the maximum value of total energy consumption of thermal head 106 is about 120 W (watt), and about 107 W thereof accumulates in film 270 or 108.

The accumulated heat brings the temperature of film 108 or ink 119 closer to the boiling point of ink 119, and changes ink ejecting conditions in accordance with the presence/absence of it. Therefore, if heat in film 108 or ink 119 is allowed to accumulate, irregular image recording densities can result.

In this embodiment, however, heating elements 104 are formed on 15-μm thick polyimide film 270 through conductors 260 and 262 and are adhered to metal supporting member 272, so that heat energy generated and accumulated by heating elements 104 is immediately transmitted to and diffused in supporting member 272.

Since heat energy diffused in supporting member 272 is very quickly transmitted because of metal member 272, heating elements 104 are cooled thereby. In this case, the heating cycle of heating elements 104 can be shortened, and recording speed can be increased.

Figure 10:
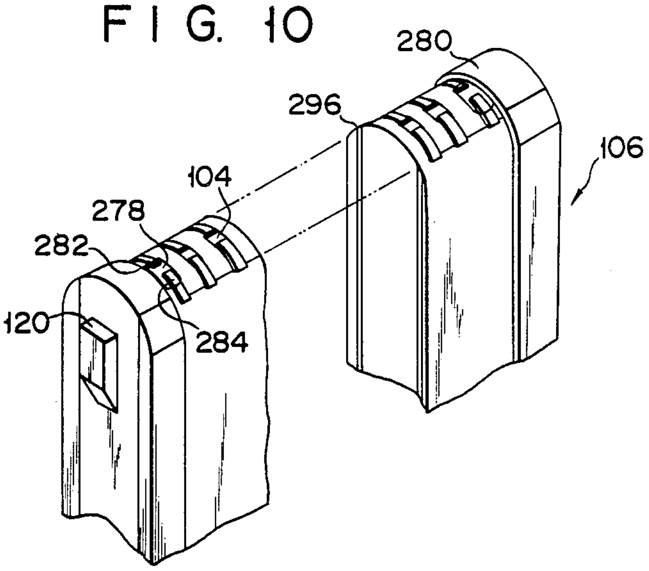
FIG. 10 is a schematic, perspective cut-away view of a thermal head.
Figure 11:
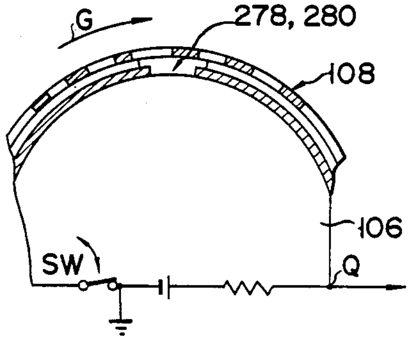
FIGS. 11 and 12 are illustrations for explaining the operation of a detection mechanism for detecting ink on the ink film.
Figure 12:
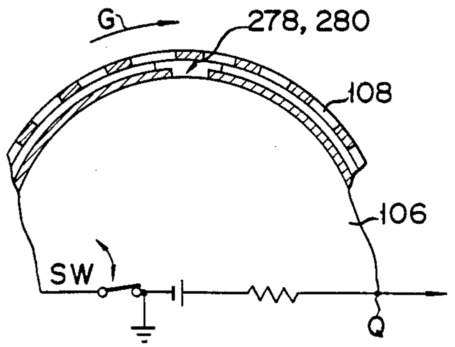

The structure of ink detection elements 278 and 280 in thermal head 106 will now be described with reference to FIGS. 10 to 12. In this embodiment, ink detection elements 278 and 280, each consisting of opposing exposed conductor portions 282 and 284 are provided at two end portions of thermal head 106, and are in direct contact with ink 119 without going through wear-resistant insulating film 286.

The conductivity of ink 119 used in this embodiment is $10^{-3}$ S/cm, S is equal to $1/\Omega$, and application of a voltage will cause a small current to flow therethrough. FIG. 11 shows this state. When voltage pulses are supplied to exposed conductor portions 282 and 284 upon ON-OFF operation of switch SW, if ink 119 is at the top of thermal head 106, as shown in FIG. 11, when switch SW is turned on, the voltage at point Q is temporarily reduced since the current flows between portions 282 and 284. Therefore, ink detection elements 278 and 280 amplify a signal from point Q corresponding to a change in voltage to detect that ink is present. When ink 119 is absent as shown in FIG. 12, since no current flows upon the ON-OFF operation of switch SW, the voltage drop described above does not occur. Therefore, when no voltage drop is detected at point Q, it can be detected by thermal head 106 that there is no ink 119 on film 108, whereupon the recording operation is inhibited. In this embodiment, ink detection elements 278 and 280 are arranged on thermal head 106 at two ends of heating element 104 array to protect heating elements 104 from unnecessary heating when there is no ink 119 on film 108. Therefore, damage of heating elements 104 can be prevented.

For example, when there is ink 119 at one side of heating element 104 array but none at the other side thereof, since ink is detected by ANDing the signals from elements 278 and 280, the absence of ink can be detected reliably.

In this embodiment, ink detection mechanism 179 constituted by ink detection LED 177 and photosensor 178 is arranged on thermal head 106 in addition to ink detecting elements 278 and 280. These ink detection means are combined and operated as follows.

In ink detection elements 278 and 280 of thermal head 106, if a voltage is continuously applied to ink 119, ink 119 is electrolyzed and generates hydrogen or oxygen gas, or exposed conductor portions 282 and 284 are corroded. In order to prevent this, a voltage is applied to portions 282 and 284 prior to the recording operation, thus detecting the presence/absence of ink. When the "no ink" state is detected by the ink detection operation, film drive motor 200 is driven to reciprocate film 108 in the directions indicated by arrows G and F (FIG. 6), and thereafter the ink detection operation is again performed.

If film 108 is temporarily stopped and ink 119 is evaporated from the portion of film 108 above heating elements 104 of head 106, the ink detection operation is performed again to detect that ink 119 in cartridge 110 is also used up. It can also be detected if ink 119 has reached ink supply portions 164 and 166 of cartridge 110 from ink tank 138 immediately after cartridge 110 is set on the printer.

When the no ink state is detected by thermal head 106, it is displayed on a display section of data processing apparatus 38 (FIG. 17), thus notifying the operator.

The relationship between the ink detection operation by thermal head 106, the ink detection signal, the detection signal of refill ink in ink tank 138, and the printer operation will now be described. In this embodiment, only when the ink present detection signal from thermal head 106 and that from ink·tank 138 are simultaneously generated, a recording medium, i.e., recording sheet 14 is fed toward heating elements 104. Therefore, ink 119 will not be used up during the recording operation, and the recording operation will not be interrupted.

When the no ink detection signal of thermal head 106 and the ink present detection signal of ink tank 138 are simultaneously generated as above, film drive mechanism 198, comprising film drive motor 100 and film drive shafts 204 and 206, is operated to interrupt supply of ink 119 to heating elements 104 of head 106. In this case, film 108 is moved at a speed of, e.g., 5 mm/sec slower than a normal moving speed (20 mm/sec). Thereby, when there is no ink 119, damage to wear-resistant insulating film 264 of electrical conductors 260 and 262 due to friction between thermal head 106 and film 108 can be prevented.

In this way, film drive mechanism 198 is operated to reciprocate film 108 until the no ink signal of thermal head 106 is changed to the ink present signal.

A "standby" state is displayed on the display section (not shown) of data processing apparatus 38, thus signaling to the operator that ink 119 is being supplied to thermal head 106.

When the ink present signal of thermal head 106 and no ink signal of ink tank 138 are simultaneously generated, "refill ink" is displayed on a display section of printer 10 or apparatus 38, thus signaling to the operator that ink tank 138 is to be changed to refill new ink 119. After new ink tank 138 is mounted and the no ink signal of ink tank 138 changes to the ink present signal, the recording operation is temporarily interrupted and sheet 14 is inhibited from being fed toward heating elements 104. This is to allow new ink 119 to sufficiently soak into ink-supply portions 164 and 166 in film cartridge 110 and to provide uniform supply of ink 119.

In this embodiment, when the no ink signal of thermal head 106 and that of ink tank 138 are simultaneously generated, it can be detected that cartridge 110 is not mounted on printer 10. This detection operation will be described with reference to FIG. 17. Such detection is made when cartridge 110 is not set, or when there is no ink 119 in thermal head 106 and ink tank 138 although cartridge 110 is set. If a specific means for detecting if cartridge 110 is mounted on printer 10 is not provided, the presence/absence of cartridge 110 can be detected based on the no ink signals of thermal head 106 and ink tank 138. In this embodiment, the presence/absence of cartridge 110 can be detected by the no ink signal of thermal head 106 and ink tank 138.

The structure of thermal head 106 will be described more detailed with reference to FIG. 13.

Thermal head 106 has metal cooling members 288 and 290 at both sides of metal supporting member 272, and temperature detection elements 292 and 294 are arranged on the surfaces of members 288 and 290, respectively. Reference numerals 296 and 298 denote heating members of thermal head 106 which are arranged parallel to and adjacent to heating elements 104.

In this embodiment, a switch (not shown) is turned on or off in response to the output signals from temperature detection elements 292 and 294 in accordance with a change in environment or heat accumulation of heating elements 104, thus maintaining the top portion of head 106 at a constant temperature.

Cooling members 288 and 290 are in direct contact with film 108, so that an increased temperature of thermal head 106 due to an increase in external temperature or heat accumulation can be effectively decreased and evaporation of ink 119 can be suppressed. In addition, heat accumulation at the top portion of head 106 is quickly conducted to temperature detection elements 292 and 294, thus keeping the temperature near heating elements 104 of head 106 constant.

Since cooling members 288 and 290 and heating members 296 and 298 for thermal head 106 are arranged at two sides of heating elements 104, when film 108 is reciprocated with respect to heating elements 104, ink 119 fed to the surface of heating elements 104 or holes 109 filled with ink can be maintained at a constant temperature in advance.

A control circuit for printer 10 will now be described with reference to FIG. 17.

Electrical circuit 252 incorporating a central processing unit (CPU) is connected to thermal head 106 through driver 274. Circuit 252 is also connected to motor 200, motor 36 for driving feed rollers 20, which pick up sheet 14 from cassette 16, fan 254, heating members 296 and 298 of thermal head 106, solenoid 28 for connecting/disconnecting feed rollers 20 and motor 36, and solenoid 92 for lifting up guide plate 80, respectively, through drivers 300, 302, 304, 306, 308, 310, and 312. All of these components are driven in response to a control signal from circuit 252.

Circuit 252 is also connected to position detector 250 for detecting a rotating position of wheel 244 mounted on the shaft of motor 200, and motor 200 is driven in accordance with the position detection signal from detector 250.

Ink detection elements 278 and 280 are connected to circuit 252 through first AND gate 314. Ink detection mechanism 179 of ink tank 138 is connected to circuit 252 through second AND gate 316. Circuit 252 supplies a "no ink" display signal to a control panel (not shown) in accordance with the ink detection signal, as described previously.

Circuit 252 is also connected to paper detector 60 provided at the entrance of paper convey unit 48 and paper discharge detector 132 for detecting that sheet 14 is discharged onto tray 130. Detectors 60 and 132 respectively supply detection signals to circuit 252. Circuit 252 supplies "no-paper" and "paper-jam" display signals to the control panel (not shown) in accordance with the detection signals from detectors 60 and 132.

Circuit 252 is also connected to temperature detection elements 292 and 294 of thermal head 106, and performs temperature control of head 106 in accordance with the output signals from elements 292 and 294.

Note that in FIG. 17, reference numerals SW1, SW2, SW3, SW4, SW5, and SW6 denote switches.

According to the embodiment of the present invention, ink supply members 164 and 166 for supplying ink 119 to film 108, film drive mechanism 198 for moving film 108, container 182 for holding these components, and seal member 144 for restricting communication of air and ink 119 are integrated to constitute film cartridge 110, and cartridge 110 is detachably mounted to allow easy maintenance, ink color change, and so on.

Since film tension mechanism 220 for continuously applying a tension to film 108 regardless of the mounting/ demounting state of cartridge 110 is provided, slack, damage, and wrinkles in film 108 can be prevented.

In addition, cartridge 110 can be mounted on printer 10, so that film 108 is in tight contact with thermal head 106.

In tension mechanism 220, torsion spring 228 for generating a torque in a direction to take up film 108 is fitted in one of film rolls 204 and 206, and film rolls 204 and 206 are biased to apply a torsion to film 108 through torsion spring 228. Therefore, a tension can be easily applied to film 108 with a simple mechanism.

In film cartridge 110, since only window 184 is formed in container 182 to surround head 106, cartridge 110 can have a sufficient mechanical strength.

Although film 108 coated with ink 119 is normally exposed from window 184, since this portion is covered with cover 190, an operator will not directly touch film 108 when cartridge 110 is mounted on or demounted from printer 10. At the same time, since cover 190 is in tight contact with seal member 144 of cartridge 110, evaporation and leakage of ink 119 in cartridge 110 can be prevented.

Two film rolls 204 and 206 are provided to film drive mechanism 198 of film 108, and since one-way clutches 212 and 214, which are rotatable only in the film take-up direction, are fitted in one end of each of rolls 204 and 206. Therefore, film 108 can be reciprocated in accordance with forward and reverse rotation of motor 200.

Note that since one-way clutches 212 and 214 are spring clutches, when one of rolls 204 and 206 is driven, corresponding one-way clutch 212 or 214 fitted in the other roll 204 or 206 slips with an appropriate friction. Therefore, this can prevent slackening of film 108 when the film drive operation begins.

The present invention is not limited to the above embodiment, and various changes and modifications may be made within the spirit and scope of the invention.

For example, holes formed in a film are not limited to through holes, but can be recesses. In this case, the same effect as in the above embodiment can be provided.

What is claimed is:

1. A printer, which forms an image on a moving sheet by ejecting ink onto the sheet in accordance with an image signal, comprising:

a thermal head having heating elements heated in accordance with the image signal;

a transfer medium in which a plurality of holes to be filled with ink are formed, and which generates bubbles from the hole when ink is heated and ejects the ink due to pressure from the bubbles, wherein when a diameter of the hole formed in said transfer medium is given as D, a pitch between two adjacent holes is given as P, a width of said heating element in a direction perpendicular to a moving direction of said transfer medium is given as H, and a width of said heating element in the moving direction of said transfer medium is given as V, relations H≧2P and V≧2P+D are satisfied;

holding means for holding said transfer medium and feeding it in the same direction as the sheet moves toward said heating elements of said thermal head with a feeding speed which is at least one-fourth of the sheet feeding speed; and ink supply means for supplying the ink to said transfer medium.

2. A printer according to claim 1, wherein in said transfer medium, a hole is formed to be separated at the same distance from other two adjacent holes.

3. A printer according to claim 1, wherein in said recording medium, an array of said holes formed adjacent to each other includes alternating rows of offset holes extending perpendicular to the moving direction of said recording medium.

4. A printer according to claim 1 wherein an array of said holes formed in said transfer medium includes alternating rows of offset holes extending substantially perpendicular to the moving direction of said transfer medium.

5. A printer according to claim 1, wherein said transfer medium has a hydrophilic surface facing said heating elements.

6. A printer according to claim 5, wherein said transfer medium comprises a nickel film as a hydrophilic material, whose surface facing said sheet is covered with a hydrophobic material.

7. A printer according to claim 1, wherein said ink supply means comprises ink removing means, which is in contact with said transfer medium, for removing excessive ink supplied to said ink supply means.

8. A printer according to claim 7, wherein said transfer medium, said holding means, said ink supply means, and said ink removing means are integrally provided in a cartridge.

9. A printer according to claim 8, wherein said holding means has a pair of rolls for winding said transfer medium therearound, and said ink removing means extends substantially parallel to said roll adjacent thereto.

10. A printer according to claim 9, wherein said ink removing means comprises four ink removing members, which operate in pairs to clamp said transfer medium therebetween at the side of each of said rolls in an exposing hole.

11. A printer according to claim 1, wherein said ink supply means comprises at least one ink supply member in contact with said transfer medium.

12. A printer according to claim 1, wherein D is between about 15 to 35 μm and P is between about 40 to 50 μm.

13. A printer according to claim 1, wherein the moving speed of the film is at least one-half of the moving speed of the sheet.

14. A printer, which forms an image on a moving sheet by ejecting ink onto the sheet in accordance with an image signal, comprising:

a thermal head having heating elements heated in accordance with the image signal;

a transfer medium in which a plurality of holes to be filled with ink are formed, and which generates bubbles from the hole when ink is heated and ejects the ink due to pressure from the bubbles, wherein when a diameter of the hole formed in said transfer medium is given as D, a pitch between two adjacent holes is given as P, a width of said heating element in a direction perpendicular to a moving direction of said transfer medium is given as H, and a width of said heating element in the moving direction of said transfer medium is given as V, relations H≧2P and V≧2P+D are satisfied, said transfer medium having a hydrophobic surface facing said sheet;

holding means for holding said transfer medium and feeding it in the same direction as the sheet moves toward said heating elements of said thermal head with a feeding speed which is at least one-fourth of the sheet feeding speed; and ink supply means for supplying the ink to said transfer medium.

15. A printer according to claim 14, wherein said ink removing means is in contact with the hydrophobic surface of said transfer medium.

16. A printer according to claim 15, wherein said ink removing means is formed of a hydrophilic material.

17. A printer according to claim 16, wherein said ink removing means has an elasticity.

* * * * *